(12) United States Patent
Kanter

(10) Patent No.: US 7,831,049 B1
(45) Date of Patent: Nov. 9, 2010

(54) ENHANCED ENCRYPTION METHOD AND SYSTEM FOR ULTRA SECURE APPLICATIONS

(75) Inventor: Gregory S. Kanter, Chicago, IL (US)

(73) Assignee: Nucrypt, LLC, Evanston, IL (US)

( * ) Notice: Subject to any disclaimer, the term of this patent is extended or adjusted under 35 U.S.C. 154(b) by 828 days.

(21) Appl. No.: 11/747,106

(22) Filed: May 10, 2007

Related U.S. Application Data

(60) Provisional application No. 60/799,534, filed on May 10, 2006.

(51) Int. Cl.
*H04K 1/00* (2006.01)
*G09C 3/00* (2006.01)
*G06F 11/00* (2006.01)

(52) U.S. Cl. .................. 380/256; 380/54; 713/500; 713/501; 713/502; 713/503

(58) Field of Classification Search .................. 380/256
See application file for complete search history.

(56) References Cited

U.S. PATENT DOCUMENTS

| 7,333,611 | B1 * | 2/2008 | Yuen et al. .................. 380/256 |
| 7,646,980 | B1 * | 1/2010 | Menendez .................... 398/77 |
| 2008/0043871 | A1 * | 2/2008 | Latouche et al. ............ 375/261 |

* cited by examiner

*Primary Examiner*—Longbit Chai
(74) *Attorney, Agent, or Firm*—Nadya Reingand

(57) ABSTRACT

Techniques to bolster the security of an AlphaEta cryptosystem using spectral phase encoding. In one aspect, a spatial light modulator (SLM) is used to change the spectral code (spectral phase) of each optical bit in response to the output of an extended key generator based on a cryptographic algorithm. In other aspects, additional time and polarization modulations are used to maintain high security levels as well as good performance levels. Such methods are combined with traditional key generation methods such as key-distribution centers or one-way mathematical algorithms to bolster the security of traditional key generation as well.

38 Claims, 4 Drawing Sheets

ENHANCED ENCRYPTION METHOD AND SYSTEM FOR ULTRA SECURE APPLICATIONS

CROSS REFERENCE TO RELATED APPLICATIONS

This application claims priority to U.S. Provisional Patent Application No. 60/799,534 filed on May 10th, 2006.

BACKGROUND

1. Field

The present invention relates to cryptography, and more particularly to the enhancement of security in encryption and key generation by extending noise-based physical encryption techniques. The invention also relates to optical communications.

2. Related Art

Two of the main topics of cryptography are encryption and key generation. Encryption aims to maintain the secrecy of a message and usually requires a short secret to be shared between the two communicating parties. Key generation is a method of generating (or expanding) that short secret. There are many traditional cryptographic methods of attaining these objectives, including the Advanced Encryption Standard for encryption and the Diffie-Hellman (DH) algorithm for key expansion/generation [reference 1]. Such algorithms make it difficult for an attacker to read the secret message or discover the shared secret key used between the transmitter and receiver. However, it is difficult to quantify how hard it is for an eavesdropper to attack these systems. As such, it is always useful to be able to make any cryptographic method more secure.

SUMMARY

In the method in accordance with the present invention, additional techniques are described that further bolster the security of an AlphaEta cryptosystem [references 2, 4, 5]. In particular we examine how to use spectral phase encoding to improve the security of AlphaEta (AE). One embodiment uses a spatial light modulator (SLM) [reference 6] to change the spectral code (spectral phase) of each optical bit in response to the output of an extended key generator based on a cryptographic algorithm [reference 2], however such a method is difficult to implement at reasonable data rates with current technology and is not necessarily optimized from a security standpoint. For instance, the slow update rate of most SLMs would force neighboring pulses to have a long space in between them, which could allow for an attacker to coherently combine the neighboring pulses and use a spectral filter combined with an array of relatively slow detectors to measure the spectral phases applied. Although such a measurement would be very noisy and thus inherently have improved security, the measurement itself is not necessarily prohibitively difficult. Ideally, we would want to make it much more difficult to even measure the encrypted message as well as to decipher it. We would also like to increase the rate of communication.

Two of the most common current spatial light modulators for spectral phase encoding are liquid crystal (LC) and acousto-optic modulators (AOMs) [reference 4]. LC modulators have very low bandwidths, which means that they can only be updated at low rates (~100 Hz), making an encryption scheme based on refreshing LC masks every transmitted bit very slow. AOMs are somewhat faster (~1 MHz), but this still may be too limiting as desired data rates are much higher than AOMs are directly capable of.

Disclosed embodiments modulate the signal in a way that current SLMs or other spectral phase-encoders can be used which still maintain high levels of security in theory and practice as well as maintain good performance levels. These methods make use of additional time and polarization modulations, which can be useful for increasing security with or without spectral phase encoding (SPE). For instance, one embodiment applies a fast low-resolution phase modulation on top of the usual slower high-resolution phase modulation. The SPE phase mask can be an evolving mask that partially changes every data symbol. Such a mask could be made from an acousto-optic modulator. By employing a high-repetition rate optical pulse source which has a pulse rate generally faster than the symbol rate, we can cause the individual pulses after the SPE to overlap strongly in the time-domain. These individual pulses can each have a different low-resolution phase modulation (applied before the SPE), causing the measurement of the various phase shifts to become very difficult. Such methods can be combined with traditional key generation methods such as key-distribution centers or one-way mathematical algorithms like the Diffie-Hellman algorithm to bolster the security of traditional key generation as well. Some of the newly created key material can be fed back to update the keys of the AlphaEta encryption system transmitting the key exchange protocol bits.

BRIEF DESCRIPTION OF DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION

Figure 1:
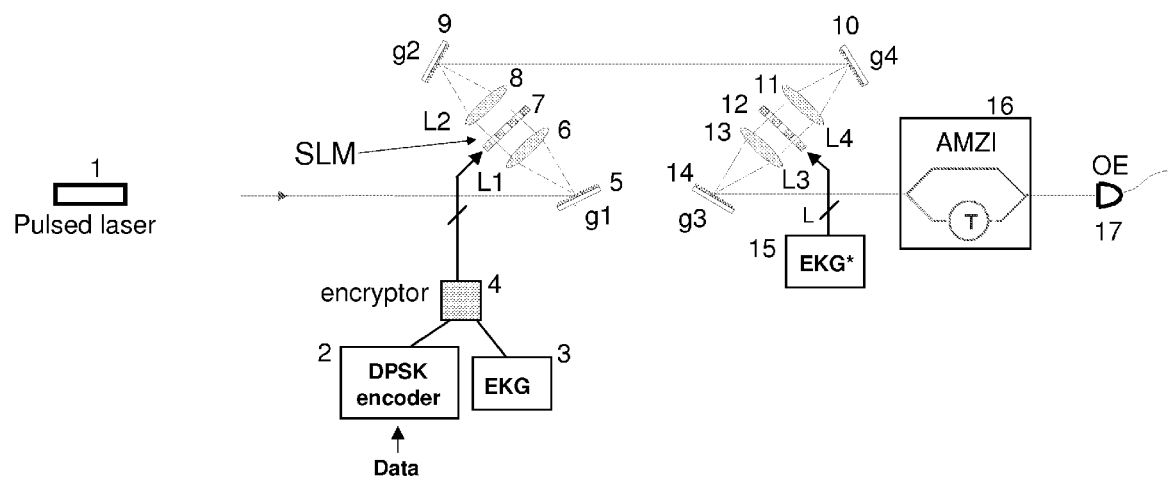
FIG. 1 illustrates an AE-SPE system using a spatial-light modulator (SLM). The DPSK phase modulation is performed by the SLM, along with a spatially varying phase profile (encryption mask) with L elements of resolution. The phase-mask can be changed every data bit. At the receiver SLM the encryption mask is cancelled out leaving a standard DPSK signal.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

A new encryption method that makes use of both traditional encryption methods and various physical effects such as quantum noise has been proposed in order to make encrypted messages more difficult to attack [reference 2]. This method is called AlphaEta, and it performs encryption directly at the physical layer. Standard AlphaEta implementations are designed to work at high data rates and use minimal additional equipment in order to be compatible with traditional optical systems and to keep costs down.

Disclosed herein is an augmented version of an AlphaEta cryptosystem using additional techniques, such as spectral-phase encoding (SPE), in order to add further security for ultra-secure applications. While the enhanced encryption security is important in and of itself for transmitting highly secure messages, the disclosed enhanced versions of AlphaEta are particularly well suited for combining with traditional key generation methods to improve the inherent security of the traditional algorithms. This improved key-generation security stems in part from the difficulty an eavesdropper has in simply recording the ciphertext (encrypted message). Unlike methods based on purely quantum mechanical effects, such as BB-84 type quantum key distribution [reference 3], AlphaEta performs similarly to traditional optical communication systems. The disclosed enhanced AlphaEta systems thus increase security without a significant degradation in performance and, unlike BB-84 quantum key distribution, can propagate significant distances in fiber or free-space links.

AlphaEta with Spectral Phase Encoding (AE-SPE)

We propose to use spectral-phase-encoding (SPE) to make even observing the encrypted signal extremely difficult. SPE also adds an additional layer to the key security by both reducing an eavesdropper's signal-to-noise ratio on measured phase-shifts (spectral phase shifts) and substantially increasing the complexity of the signal. The additional layer can in theory allow faster data rates at a given level of security or higher intrinsic security at a given data rate. However, a major benefit of SPE lies in the inherent difficulty of launching even the weak ciphertext-recording attack (recording but not analyzing the encrypted signal). We note that the proposed techniques to strengthen SPE-based AlphaEta systems can also be used independently of SPE.

AlphaEta is a method of physically encrypting a signal. AlphaEta is described in U.S. patent application Ser. No. 10/674,241, entitled "Ultra-Secure, Ultra-Efficient Cryptographic System", filed on Sep. 29, 2003, and U.S. patent application Ser. No. 10/982,196, entitled "Coherent-states based quantum data-encryption through optically-amplified WDM communication Networks", filed on Nov. 5, 2004, which applications are hereby incorporated herein by reference in their entirety.

One method of combining AlphaEta with SPE (AE-SPE) would be to change the SPE phase mask every bit based on the output of an extended key generator and the data itself. This is analogous to the way AlphaEta is typically implemented, but instead of using a single phase modulator one can independently modulate different spectral components of the signal. In the present embodiments, we will assume for convenience the data is modulated via a differential-phase shift keyed modulation method [reference 4], further noting that there are other methods of implementing AlphaEta which could also be applied. In the differential-phase shift keyed (DPSK) mode of operation, Bob simply applies the conjugate SPE decryption phase-mask (reversing the encryption phase shifts but not the phase-shift based on the data) and is left with a traditional DPSK signal.

One implementation of such a technique is depicted in FIG. 1. Here a pulsed laser 1 generates a wide optical spectrum for the spectral phase modulation. The spectrum is imaged onto a spatial light modulator 7 by a system of gratings 5,9 and lenses 6,8. In so doing multiple independent bins of spectrum are available for modulation. The phase shifts applied to the individual bins of spectrum are determined from an extended key generator (EKG) 3 which is a pseudo-random number generator seeded with a secret key. In this case, we make the possible range of applied phase shifts chosen by the EKG to vary between zero and $2\pi$ for each frequency bin. This allows the DPSK data, which is determined by the DPSK encoder 2 to be either a 0 or $\pi$ phase shift, to be simply added (either directly or modulo-$2\pi$) to each frequency bin. This addition is performed in the encryptor 4. The DPSK data defines a single differential pulse-to-pulse phase shift, while the EKG-based encryption causes multiple different spectral phases to be applied each pulse. At the receiver a similar configuration of gratings 10,14 and lenses 11,13 re-image the transmitted signal onto the receiver's SLM 12. The receiver shares the same secret key and EKG with the transmitter and is able to generate the opposite individual spectral phase shifts, thereby canceling out the encryption. This opposite spectral phase shift is determined by the receiver EKG* 15 and applied to the SLM. After this decryption the received signal will be a standard DPSK signal [reference 4] which can be de-coded by interfering neighboring bits on an asymmetric Mach-Zehnder interferometer (AMZI) 16 followed by optical-to-electrical (OE) conversion 17.

While the system illustrated in FIG. 1 works well, further improvements are possible. In practice, current technology suggests the SLM will be constructed from either a liquid crystal (LC), an acousto-optic modulator (AOM), or some other method which is difficult to modulate at the desired high data rates. The LC may have a long refresh time of 10-100 ms, which makes changing the mask every bit far too slow (<100 bits/second) for most applications. In order to maintain reasonable bandwidth, the same LC mask is used for a prolonged period (during which multiple bits are transmitted), which makes the mask more vulnerable to attacks. AOM's are somewhat faster (~1 MHz), but since their mask constantly evolves in time they are suitable for low repetition rate sources where the mask can be fully reset each pulse. However, even when the low data rates of such SLMs are acceptable, it is possible for an eavesdropper to use low-bandwidth detectors to measure the differential phases of each of the applied spectral phase shifts by interfering two neighboring bits. This is true because the pulses are separable in time and come at a very low repetition rate. Since low-bandwidth detectors are much less expensive then high bandwidth detectors, we would rather force the use of high bandwidth detectors. Since differential phase measurements are easier than fully coherent measurements, we would rather force the use of coherent measurements. Thus, from a perspective of the difficulty of measuring the ciphertext (encrypted signal), we presently describe improvements to the system of FIG. 1.

Several additional techniques are presented to allow the use of slow SLMs to be used as spectral phase encoders in our highly secure AlphaEta encryption systems, although these techniques may also be applicable to SPE implemented with fast SLMs as well as to AlphaEta systems not using SPE at all. These include, for instance, multiple layers of phase modulation including a super-fast binary phase modulation, and inhibiting the use of differential detection by causing inter-symbol interference via the use of high-repetition rate pulses that overlap (after being dispersed by the SPE element) in the time domain.

Figure 2:
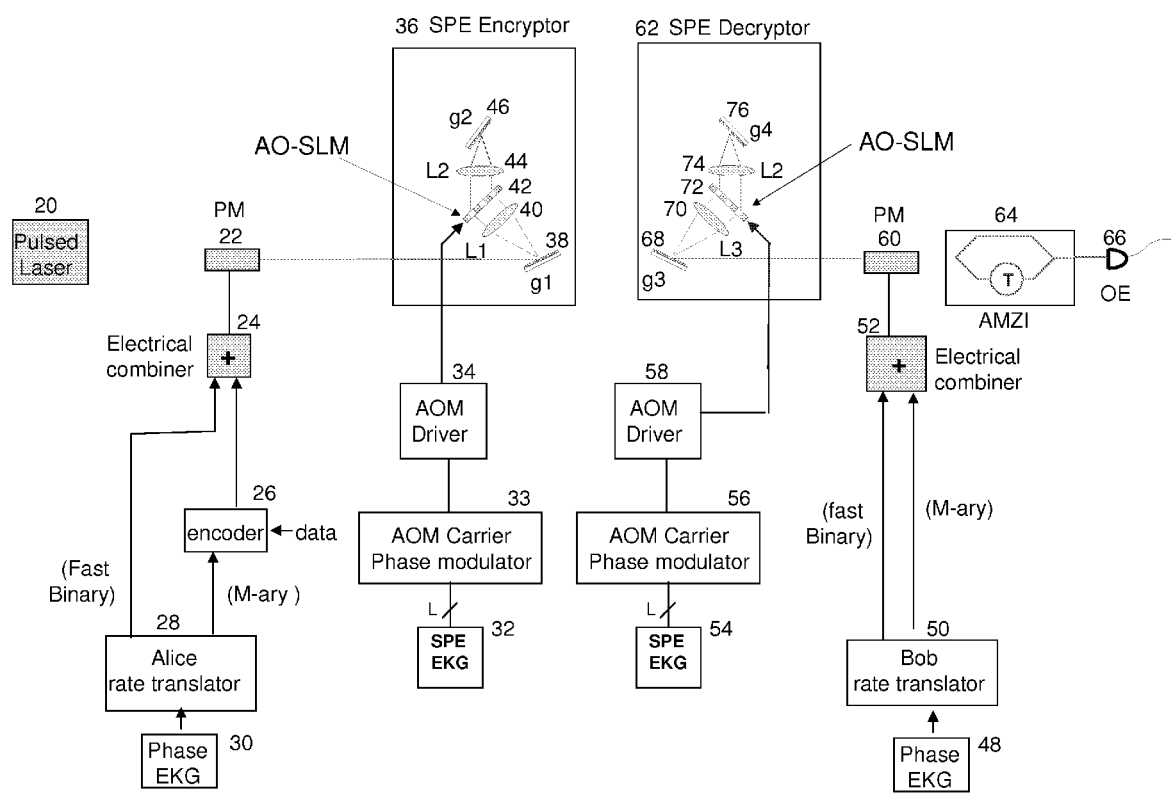
FIG. 2 illustrates an overlay of spectral phase modulation via an acousto-optic modulator used as a spatial light modulator (AO-SLM) with AlphaEta encryption applied via a standard phase modulator (PM). A high repetition rate optical pulse source is used. Short, distinguishable, and stable pulses are observable before the first SLM and after the conjugate (receiver) SLM but not in between, where the pulses can strongly overlap in time.

One embodiment of the present invention is depicted in FIG. 2. Here we use a high repetition rate laser 20 and various rates of phase modulation including a low-speed M-ary phase modulation and a high speed binary (or M-ary with low M) modulation in order to improve the system security. Note that the low-M-ary modulation is easier to perform at high rates in practice. Instead of a statically changed SLM, an acousto-optic modulator (AOM) can be used as the SLM 42. The AOM mask is generated by an acoustic wave generated in the AOM crystal by the AOM driver 34, and the mask thus constantly moves through the device. The acoustic wave typically passes through the crystal fairly quickly, for instance on the order of 1 µs. AOMs are not often used for spectral shaping in communications applications like optical code division multiple access (OCDMA), as they can not produce the same mask for high repetition rate lasers (>1 MHz), thereby limiting the communications bandwidth. However, they can be reprogrammed much faster than LCs and are a cheaper, better developed technology. Nevertheless, a straight-forward use of AOMs (changing the SLM mask every bit) still has a fairly low repetition rate.

The embodiment in FIG. 2 is thus in many ways an improvement over the previous architecture. For the purposes of illustration, specific numbers will be analyzed for the parameters of various components. However these are merely an example of one possible implementation. A high repetition rate laser, for instance at 40 giga pulses/sec, is used to create the optical pulses that are manipulated by the AOM. This can not be done with standard OCDMA, as OCDMA uses the same mask every bit, and this method produces a constantly evolving mask. However, it is a significant benefit for AE-SPE because the mask will evolve and completely change approximately every 1 µs (the exact number depending on the AOM characteristics). This fundamentally limits the signal-to-noise ratio of any mask measurement. The requirements on the eavesdropper's detectors can be further increased by keeping the symbol rate constant but using multiple pulses per symbol, each pulse with an independent fast binary phase mask. For instance a standard M-ary AlphaEta phase-mask can be overlaid at 1 Giga phase-shifts per second and a binary phase mask can be applied to each pulse (40 Giga phase-shifts per second). In this case, the AOM mask does not change appreciably from pulse to pulse, allowing for a series of short pulses to be spread out significantly and later be recompressed. However, the mask does evolve on longer time frames (for example from symbol to symbol). It is useful for security purposes for the propagating (evolving) phase mask to shift on the order of one frequency bin or more between symbols.

For instance, if there are 100 effective separate frequency bins in the spectral phase mask (the number of bins in the phase mask is determined by the properties of the AOM and imaging optics as described in [reference 6]) and the time it takes the acoustic wave to propagate through the AOM is 1 microsecond, then a desirable symbol repetition rate may be on the order of ($1/100$) microseconds. In this case, the symbol repetition rate is increased by 100 times over the rate required if the mask must be completely refreshed each pulse (a speed up from ~1 Mb/s to ~100 Mb/s in this case). Note that because of the use of the high-repetition rate laser which causes pulse overlap after the SLM, it is possible to maintain high levels of security even if the AOM mask does not change appreciably every symbol. Thus, the data rate could be sped up even further, with somewhat degraded, but still very high, security.

Let us choose as a concrete example an optical pulse width on the order of 2 picoseconds. The after passing through the 100 separate spectral phase shifts in the SPE element (the AOM SLM), the pulse will spread out to roughly 200 picoseconds. However, the original pulses were spaced by just 25 picoseconds (40 Giga pulses per second), and therefore the pulses dispersed by the SLM overlap considerably in the time domain. Fully coherent measurements are needed in order to compensate for this type of drastic dispersion [reference 8]. However, each of the 100 spectral phase bins have a large bandwidth on the order of $1/(2 ps*100)=5$ GHz. Such a large bandwidth aids in placing difficult measurement demands on a would-be eavesdropper.

In FIG. 2 a high repetition rate pulsed laser 20 is sent through a phase modulator (PM) 22. The phase modulator receives a modulating signal based on a fast binary phase modulation and a slower M-ary phase modulation. These phase modulations are determined from an EKG 30 followed by a rate translator 28 which groups the output of the EKG into fast binary and slow M-ary buses. The binary shifts out of the rate translator are normalized to provide a 0 or $\pi$ phase shift. The M-ary output out of the rate translator is combined in the encoder 26 with the DPSK data bits according to the AlphaEta protocol to create a phase shift which varies quasi-continuously from 0 to $2\pi$. These phase shifts can be combined to drive the phase modulator. This encrypted optical signal then enters the SPE Encryptor 36 for encrypting the spectral phase as well.

The SPE encryptor comprises a system of gratings 38,46 and lenses 40,44 which image the optical spectral phase onto an acousto-optic SLM 42. The SPE phases are determined by another EKG (the SPE EKG) 32. The two EKGs used for encryption could be combined into one or split up into more functional units for convenience and is shown in the figure for ease of understanding. The SPE EKG determines the phase shift of the AOM carrier wave inside the AOM carrier phase modulator 33. This signal then connects to an AOM driver 34 which connects to the AOM to create the acoustic-wave which modulates the spectral phase.

The SPE decryptor 62 comprises a similar optical system including gratings 68,76, lenses 70,74, and an acousto-optic SLM 72 in order to reverse the spectral phase shifts added in the SPE encryptor. The acoustic wave is generated similarly as at the transmitter by a SPE EKG 54 connected to an AOM carrier phase modulator 56 connected to an AOM driver 58. The optical pulses are now recompressed and can be decrypted using the receive-side phase modulator 60, driven by an EKG 48, followed by a rate translator 50, followed by an electrical combiner 52. After the phase modulator the optical signal is decoded in an asymmetric Mach-Zehnder interferometer (AMZI) and detected by an optical-to-electrical converter 66. Of course, any demodulator designed for DPSK signals could have been used.

By using a high repetition rate laser and creating symbols by combining many optical pulses, very few photons (very low signal-to-noise ratios) are in each pulse. Because the pulses overlap and interfere, it is very difficult to attack the binary phase mask. However, if for some reason the fast binary phase mask was made public, it would not help Eve to record the signal, since she can not apply the conjugate, fast phase mask to the SLM-dispersed pulses because the pulses overlap in time (one would need the SLM mask to recompress the pulses in order to make use of the fast phase-mask). Thus the SLM and fast phase mask enhance each other.

Figure 3:
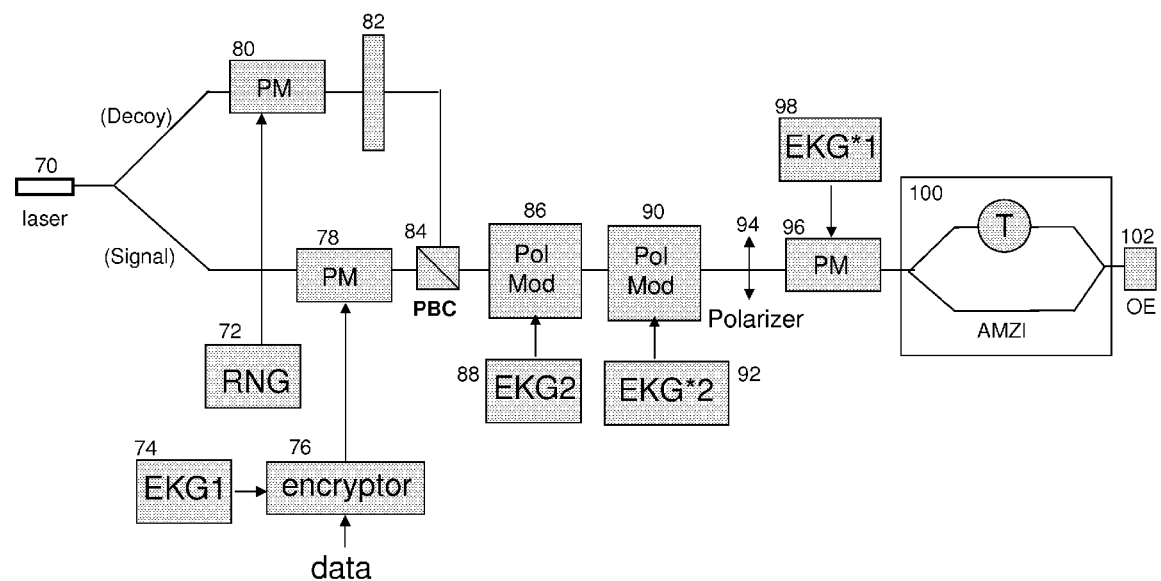
FIG. 3 illustrates an orthogonal polarization decoy signal added by Alice and stripped off by Bob.

Another technique for improving the security of AlphaEta comprises adding a perpendicularly polarized channel that has randomized phase shifts. This perpendicularly polarized signal is hereinafter referred to as the decoy signal. One implementation of a perpendicular decoy signal is depicted in FIG. 3. This technique can be applied with or without the use of SPE and is depicted in FIG. 3 without SPE for simplicity.

Additionally, only one rate of phase shifts is depicted in FIG. 3, although a fast low M-ary phase shift similar to FIG. 2 could also be used. The output of a laser 70 is split into two arms. In the 'decoy' arm a phase modulator 80 modulates the signal using an M-ary phase modulation chosen by a random number generator (RNG) 72, which may be a truly random number generator based on a physical noise source or a random-number seeded pseudo-random number generator.

This signal is then rotated by a waveplate 82 so that it is reflected by a polarization beam cube (PBC) 84. The 'signal' arm is also modulated by a phase modulator 78 but the modulation is chosen per AlphaEta, by an encryptor 76 applying the AlphaEta protocol to inputs from an EKG (EKG1) 74 and data. This signal passes through the PBC and is thus combined with the decoy such that the signal and decoy are in orthogonal polarization modes. A polarization rotation of these two orthogonal polarization modes is then applied by a polarization modulator 86 based on the output of an EKG (EKG2) 88.

In one embodiment, the polarization rotation occurs on a time scale such that a small number (ideally <1) of incident photons pass the modulator between rotations, but can be slowed down for convenience as well. This polarization rotation mixes the random decoy signal with the encrypted signal for those eavesdroppers without the key (seed key of EKG2).

This has several effects. Firstly, it forces an attacker to make measurements on two polarization axes, thereby doubling her measurement burden. Additionally, the decoy channel adds an additional randomization to the cipher for those that do not know the polarization key. This is a type of randomized cipher and it technically does experience an effective bandwidth reduction due to the fact that only one of two possible polarizations is used to transmit data. However, since this is the standard for optical communications there is no bandwidth reduction in practice.

Finally this method of signaling makes differential detection (such as by interfering the signal with a time-delayed version of itself using an asymmetric interferometer) much more difficult for an attacker, as the desired signal and the decoy signal will interfere in a complex and un-correctable way. Differential detection is easier than direct coherent detection, so this method places additional measurement burdens on Eve. The receiver, however, has the conjugate polarization rotation information via his EKG (EKG*2) 92 which after the polarization modulator 90 can re-align the two polarization states such that a polarizer 94 can eliminate the decoy signal. Another phase modulator 96 driven by an extended key generator (EKG*1) can decrypt the phase modulation caused by the signal phase modulator 78. Finally the differentially encoded signal is decoded with an AMZI 100 and detected with an optical-to-electrical converter 102, as usual. Note that even without the decoy signal, phase modulation can be combined with polarization modulation (instead of using just one or the other) to increase the complexity and security of the system.

Decoy signals can also be applied to the same polarization mode as the encrypted data-bearing signal, provided SPE is used and the pulses overlap after the SPE-based dispersion. After the signal pulses are recompressed at the receiver, the decoy can be preferentially rejected by time-gating on the short compressed signal pulse.

The method of adding a decoy signal can be used with or without SPE techniques. If the transmit SPE mask changes slower than the symbol rate and the SPE-dispersed signal pulses do not overlap substantially in the time-domain, a receiver may be able to decipher the message without the spectral phase encoding secret key (without the receive-side SLM at all), which is a potential benefit for certain cases such as communication from ground to satellite where size and weight are important. This is because after rejecting the decoy pulse the receiver can interfere neighboring pulses in an AMZI to cancel out the slow SPE mask changes.

However an eavesdropper will have a much harder time because both the signal and decoy pulses will interfere in the AMZI, making coherent detection the likely attack method of choice (coherent detection maintains the signal information on the encrypted signal). This is true with or without SPE at the transmitter, but if SPE is added it will likely make attacks more difficult due to, for instance, the difficulty in creating a matched local oscillator at the coherent detector. It is no longer strictly necessary for an eavesdropper to attack the SPE code to attack the message, since the legitimate receiver does not need it (the SPE key would be useful but not required). However it is likely that in practice the SPE code will make attacks more difficult, for example due to the additional complexities in measuring the signal. Note that the SPE code can now be fully randomized as it is not shared with the receiver. Also, convenient methods of adding SPE that may be difficult to stabilize, such as splitting the signal up via a wavelength division de-multiplexer then recombining it with a wavelength division multiplexer after propagating each spectral element through different long strands of fiber, become useful as stabilization between the transmit and receive SPM elements is no longer required.

This concept can be visualized by imagining separate SPE elements in FIG. 3 in the decoy arm between the phase modulator 80 and the PBC 84, and in the signal arm between the phase modulator 78 and the PBC 84. The laser characteristics are now such that short pulses are used to generate the needed optical spectrum, however the repetition rate is such that neighboring pulses do not substantially overlap in time after the SPE elements.

The techniques described in this invention allow the use of slow SPE masks in AlphaEta encryption systems. Without such additional techniques such masks are vulnerable since they are used for a fairly long period of time and could fall prey to adaptive attacks [reference 9] or possibly attacks on the phase mask [reference 10]. AOM masks have an advantage that they can be refreshed at much higher rates than other technology of similar cost. By constantly updating the SLM phase mask (as usual based on the output of an extended key generator) we can make attacking the mask more challenging both technically (due to measurement issues) as well as theoretically (due to signal-to-noise issues).

AlphaEta with Spectral Phase Encoding for Use in Key Generation

Methods of two (or more) parties secretly sharing a sequence of numbers for purposes such as use in a symmetric key encryption system are widely used with examples being Diffie Hellman (DH) and RSA. These methods often derive their security from the difficulty of inverting certain mathematical operations. However, the difficulty of inversion is not well quantified and thus these schemes could fall prey to advanced attacks.

The information transfer in these protocols is done over an insecure channel, such that it is observable by an eavesdropper (Eve). However, Eve is forced to contend with a much more difficult mathematical problem than the legitimate users in order to determine the key. It is possible to wrap the transmitted signals in a standard symmetric encryption system, which would make attacks more difficult as the symmetric encryption system would need to be broken to read the (typically unencrypted) public key transmissions. However, the transmissions are still easily recordable by Eve, and should the symmetric key become known either through a key attack or other means, she could subsequently read the public key protocol transmissions and attack it as before.

Disclosed are techniques to use physical-layer encryption, such as advanced spectral-phase-encoded AlphaEta encryption, to bolster the security of traditional key generation protocols beyond what is possible using traditional techniques. The disclosed techniques use the properties of AlphaEta based on SPE to inhibit the ability for an eavesdropper to record the (normally public) key generation transmissions. They also feed-back fresh key material generated from the key distribution session to the encryption system in order to constantly update the encryption key. Under reasonable assumptions, an eavesdropper who is given the symmetric encryption key post-transmission and who is assumed to be able to efficiently break the key generation protocol can still only effectively attack one key session. Since the proposed physical encryption scheme is both extremely difficult to attack or to even measure, far greater burdens are placed on would-be attackers.

One traditional way to create session keys is to use a one-way function such as the Diffie-Hellman (DH) algorithm. A description of the algorithm is shown in [reference 1]. In addition to the basic DH algorithm, a secret key is also needed for authentication ($K_a$). To authenticate, once can, for instance, use a Message Authentication Code (MAC) which combines the data which has been transferred so far in the protocol with a secret authentication key to make a signature that can be created and verified by those holding the authentication keys.

The DH protocol, and one-way key generation algorithms in general, are vulnerable in the following ways:

Secrecy of the session key is assumed due to the difficulty of breaking the algorithm. If an adversary can break the DH algorithm then the session key can be determined. Specifically, if Eve can record the data sent between Alice and Bob she can work on breaking DH off-line and, once she does, she can then use her knowledge of that session key to attack any data encrypted with it. If secrets encrypted with the session key need to be maintained for long periods of time, one needs to rely on DH being impractical-to-crack well into the future.

The MAC can be attacked, as Eve knows the data input and the output signature. She can use this knowledge to try to find $K_a$ (secret authentication key). One needs to assume that there are no security flaws in the MAC, thereby allowing only a brute-force key search.

Figure 4:
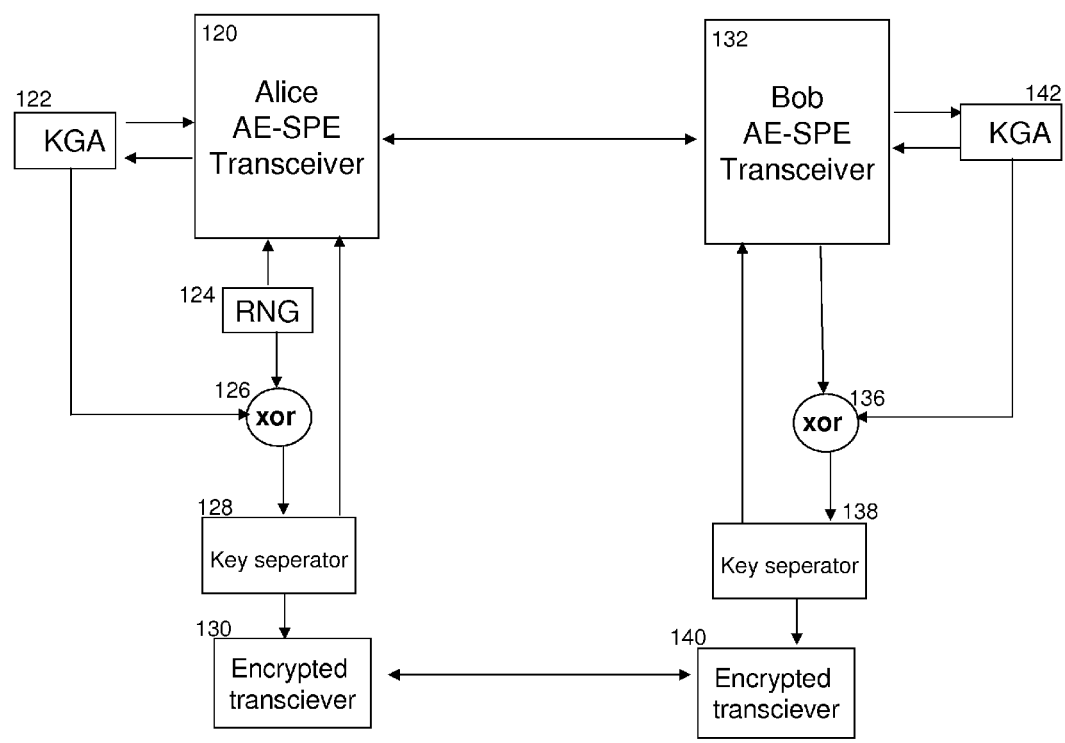
FIG. 4 is a diagram illustrating integrating a key generation algorithm (KGA) with spectral phase encoded AlphaEta encryption.

A basic method to combine AlphaEta Spectral Phase Encoded (AE-SPE) transmissions with a traditional key generation system is shown in FIG. 4. The key generation algorithms (KGAs) 122,142 determine what information needs to be sent between the two parties called Alice and Bob in order to generate a fresh key. The KGA includes the necessary functions including, for example, a DH algorithm with a MAC. A random number generator 124 can also be used to generate an initial random number for Alice to send to Bob early in the protocol. This random number will help protect the security of the system since information sent early in the protocol may be more secure than information sent later. It also acts to isolate any knowledge an eavesdropper gains on the session key, perhaps from using this key in a less-secure encryption system, from the inter-workings of the KGA. The system then transmits the required protocol information between Alice and Bob using in encrypted form using AE-SPE transceivers 120,132.

Once the protocol information has been exchanged, the KGA determines an initial key, which is then combined with the RNG number in an exclusive or (XOR) 126, 136. This randomized key is then fed to the key seperators 128,138 which use a portion of the randomized key to update the secret key used in the AE-SPE transcievers. The rest of the randomized key is the final generated session key. In FIG. 4 this final key is then used as an encryption key in a separate encrypted transceiver pair 130,140 which are used to send high-speed encrypted data.

Although the design in FIG. 4 shows two separate systems for the encryption of the key generation algorithm (AE-SPE) and sending regular encrypted data (encrypted transceiver), the same physical system could be used for both. Note that since the data rate of the key exchange protocol is less important than its security, it is likely the key exchange protocol will be transmitted at a lower data rate than the encrypted data in order to maximize the influence of the SPE element on security. However, the high-data rate encryption can be accomplished with or without using the SPE modulation function. If the added security of SPE is desired, then one simply increases the data rate even if this means that the SPE mask does not change appreciably over the symbol time interval. However, one may choose not to send data using the very short pulses used in the AE-SPE transceiver since their broad spectrum may cause dispersion issues in optical fiber or their high peak power could cause nonlinearity problems. Thus, there could be a second laser (or a filter on the original laser) which has a lower optical bandwidth that is used for the high-speed encrypted data. This optical signal could be routed around the SPE elements if desired. However, the basic hardware of the AlphaEta system such as the extended key generators and the phase modulator remain the same.

Note also that the secret encryption key used to send the key generation protocol information may be different from the secret key used to send the high-speed encrypted data. Because the encrypted data is likely to use the same key for a much longer string of data than the key generation session (thus more susceptible to attack), the keys for the two applications should be separated. The key used to encrypt the key generation session is sparsely used and thus may only need partial updating while the high-speed encrypted key is fully updated each session (if enough key material is available one could fully update both keys).

It is likely the transmitter and receiver would want to intentionally operate their key generation protocol with enough noise so that the bit-error-rate is quite high. For instance, if 1000 bits are needed for the session, we might want a bit-error-ratio of $10^{-4}$. This would allow most key generation sessions, which typically send very limited number of bits, to be successful, and would force an eavesdropper to deal with excessive amounts of noise.

Note that the basic premise of this technique does not rely on the specific protocol chosen. For instance, a protocol based on Elliptic Curve cryptography may have advantages over standard DH since fewer bits are needed to establish fresh keys, and AlphaEta with SPE is inherently more secure with fewer transmitted bits. Other variants include using algorithms that use public-key cryptography (each party has a private key known only to them, and a public key assumed to be known by everyone else). Many such algorithms can be used with various inherent features. Additionally, similar AlphaEta encryption techniques can be used in a centralized key server which sends encrypted session keys directly to individual users, with each of which the key server shares a secret key as described in [reference 1]. It is an advantageous aspect of the key distribution systems of the present invention that a suitable physical-layer encryption method (e.g. spectral phase encoded AlphaEta) is used to send some or all of the transmissions strongly encrypted. Additionally, some of the generated key material can be fed-back to update the AE-SPE keys. Also of note is the key management technique, which is implemented such that the key used to encrypt the key-generation protocol is different from the key used to send traditional encrypted data.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

REFERENCES

[1] "Practical Cryptography," N. Ferguson and B. Schneier, Wiley Publishing, 2003.
[2] U.S. patent application Ser. No. 10/674,241, entitled "Ultra-Secure, Ultra-Efficient Cryptographic System", by H. P. Yuen, P. Kumar, and G. A. Barbosa, filed on Sep. 29, 2003.
[3] "Quantum cryptography," by N. Gisin, Grégorie Ribordy, Wolfgang Tittel, and Hugo Zbinden, Rev. Mod. Phys., 74:145-195, 2002.
[4] U.S. patent application Ser. No. 10/982,196, by Corndorf et al.
[5] U.S. patent application Ser. No. 11/404,329, by Liang et al, filed on Apr. 13, 2006.
[6] A. Weiner, Review of Scientific Instruments v. 71 #5, May 2000.
[7] Etemad et al, Photonics Technology Letters v. 17 #4 Apr. 2005.
[8] Savory et al, Optics Express v. 15 #5 Mar. 2007.
[9] Chen et al, Optics Express v. 15 #9 Apr. 2007.
[10] D. Meshulauch et al., JOSAB, "Real time adaptive femto-second pulse shaping," v. 15, #5, May 1998.
[11] Shake, Journal of Lightwave Technology 23 (4) April 2005.

What I claim is:

1. A method for transmitting an encrypted optical signal over a communication link, comprising:
    applying a first phase shift to a signal, the first phase shift according to a combination of an M-ary temporal phase mask based on an output of a first pseudorandom generator and a data to be transmitted;
    applying a second M'-ary phase shift to the signal based on output of a second pseudorandom generator;
    transmitting the signal over the communication link;
    receiving the signal, the signal thus having reduced signal-to-noise ratio for a potential eavesdropper; and
    wherein the second phase shift is according to a fast M'-ary temporal phase mask which changes faster than the M-ary temporal mask and where M'<M.

2. The method of claim 1, wherein M'=2.

3. The method of claim 2, wherein the signal is a differential-phase shift keyed modulated (DPSK) signal.

4. The method of claim 1, wherein multiple phase shifts are applied to a plurality of frequency bins of the signal using a spectral-phase encoding (SPE) mask, whereas the mask phase shifts are determined by an output of a third pseudorandom number generator and the mask phase shifts are updated periodically over time.

5. The method of claim 4, wherein the spectral-phase encoding is applied using a spatial light modulator.

6. The method of claim 4, wherein the frequency bins are spaced >5 GHz apart such that combining adjacent frequency bins forms a high beat frequency so as to require broad-band detection equipment to measure.

7. The method of claim 4, further comprising changing the SPE mask once per data symbol.

8. The method of claim 4, further comprising changing the SPE mask once per packet.

9. The method of claim 4, further comprising partially changing the SPE mask once per symbol.

10. The method of claim 9, wherein the partially changing comprises creating a partial mask change per symbol using an acousto-optic modulator (AOM) with a continually evolving phase mask.

11. The method of claim 10, wherein the AOM phase mask propagates on the order of one or more frequency bins per symbol.

12. The method of claim 4, wherein the signal is a pulsed signal comprising a plurality of pulses originating from a pulse source, wherein a dispersion caused by the SPE mask causes the plurality of pulses to substantially overlap in the time domain.

13. The method of claim 12, further comprising: modulating the plurality of pulses using a plurality of phase shifts.

14. The method of claim 13, wherein each pulse has a different phase shift applied via the M'-ary temporal phase mask.

15. The method of claim 13, wherein a symbol rate of the signal is smaller than a repetition rate of the pulse source.

16. The method of claim 15, wherein a data rate of the signal is smaller than the repetition rate of the pulse source, thereby allowing low bit-error ratio detection of signal symbols using a small number of photons per pulse.

17. The method of claim 12, further comprising:
    generating a pulsed decoy signal occupying the same polarization as the pulsed signal;
    spectral phase encoding the decoy signal with an encoding mask determined by a decoy random number generator or other random source; and combining the encrypted signal with the pulsed decoy signal, thereby allowing the pulsed decoy signal and the encrypted signal to co-propagate and overlap in the time domain.

18. The method of claim 17, wherein an opposite pseudo-random spectral phase mask based on a receive-side pseudo-random number generator identical to the third pseudo-random number generator can be applied in order to recompress the signal and largely separate it from the uncompressed decoy signal so as to discriminate between the two at a receiver.

19. The apparatus of claim 4, wherein the EKG and the second spectral phase encoding EKG are derived from one extended key generator.

20. The method of claim 1, wherein the signal receiving comprising:
applying a decrypting signal to the received signal where the decrypting signal contains a first M-ary temporal phase shift and a second M'-ary temporal phase shift and where the phase shifts to be applied are determined by the same type of pseudorandom number generators as at the transmitter, and the rate the M-ary and M'-ary phase shifts are applied are the same as at the transmitter.

21. The method of claim 1, further comprising:
generating a phase modulated decoy signal perpendicularly polarized to the encrypted signal to be transmitted;
combining the encrypted signal to be transmitted with the decoy signal to produce a combined signal; and
polarization rotating the combined signal based on an output of a third pseudorandom number.

22. The method of claim 21, wherein the modulation of the decoy signal is randomly chosen based on the output of a decoy random number generator.

23. The method of claim 22, wherein the first decoy random number generator is a randomly-seeded pseudo-random number generator.

24. The method of claim 21, wherein the encrypted signal to be transmitted is also spectrally phase encoded according to a fourth pseudo-random number generator and the decoy signal is spectrally phase encoded according to a second decoy_random number generator.

25. The method of claim 24, wherein the signal after the spectral phase encoding does not substantially overlap in time, allowing for a receiver to decrypt the signal without the conjugate spectral phase encoding mask.

26. The method of claim 25, wherein the spectral phases imparted on the signal are randomly or pseudorandomly generated or generated by random system parameter drifts.

27. The method of claim 1, further comprising:
transmitting encrypted information for establishing a key generation session according to a key generation protocol.

28. The method of claim 27, further comprising:
setting a noise level to cause rejection of a fraction of valid key generation sessions.

29. The method of claim 27, further comprising:
transmitting encrypted data once the key generation session establishes a key.

30. The method of claim 29, wherein lower data rates are used for transmitting key generation information than for transmitting encrypted data, thereby optimizing for security during key generation and for data rate after key generation.

31. The method of claim 30, wherein some of the new key material created by the key generation session is fed back to update a secret key used for encrypting the key generation session.

32. The method of claim 29, further comprising:
choosing a first encryption key for the key generation session and a different second encryption key for data transmissions after the key generation session.

33. The method of claim 27, further comprising:
transmitting an encrypted random number during the key generation session to XOR with a key generated by the key generation session, the XOR result representing a final key.

34. The method of claim 27, wherein an encrypted signal is used by a key server to distribute encrypted secret keys to individual users.

35. An apparatus for signal encryption, comprising:
a laser to generate an optical spectrum for creating a plurality of frequency bins available for modulation;
a first extended key generator (EKG) to produce a pseudo-random output to determine a phase shift for initial encryption;
a rate translator to group the output of the EKG into (a) a fast binary output normalized to provide a first 0 or $\pi$ phase shift, and (b) a slower M-ary phase shift output from 0 to $\pi$;
an encoder to combine the M-ary phase shift output with a set of encoded data bits according to an AlphaEta protocol, thereby creating a second phase shift varying quasi-continuously from 0 to $2\pi$; and
a phase modulator;
wherein the first and second phase shifts are combined_to drive the phase modulator and encrypt the optical field, producing an encrypted signal.

36. The apparatus of claim 35, wherein the laser is a pulsed laser.

37. The apparatus of claim 35, further comprising:
a spectral phase encoder to further encrypt a spectral phase of the encrypted signal.

38. The apparatus of claim 37, wherein the spectral phase encoder applies the spectral phase shift using an acousto-optical modulator (AOM).

* * * * *